US011722485B2

(12) United States Patent
Barrett et al.

(10) Patent No.: US 11,722,485 B2
(45) Date of Patent: Aug. 8, 2023

(54) METHOD AND SYSTEM FOR INTEGRATING VOICE BIOMETRICS

(71) Applicant: JPMorgan Chase Bank, N.A., New York, NY (US)

(72) Inventors: Donna M. Barrett, Wilmington, DE (US); Julia Cay, Columbus, OH (US); Brian Flanagan, Wilmington, DE (US); Corinne Bigelow, Columbus, OH (US); Kalpana Jayaraman, Newark, NJ (US); Laura Yost, Westerville, OH (US); Paul D. Magasiny, Kennett Square, PA (US); Steven Fishman, Plainview, NY (US); Rafid A. Zane, Kendall Park, NJ (US); Stephanie J. Schrieber, Galena, OH (US); Bryant R. Barrera, Wesley Chapel, FL (US); Slobodan Petkovich, Hillsdale, NJ (US); Matthew D. Matheny, Mount Vernon, OH (US); Nikhil Dhoble, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 729 days.

(21) Appl. No.: 16/570,480

(22) Filed: Sep. 13, 2019

(65) Prior Publication Data
US 2021/0084033 A1    Mar. 18, 2021

(51) Int. Cl.
*H04L 29/06* (2006.01)
*H04L 9/40* (2022.01)
(Continued)

(52) U.S. Cl.
CPC ........ *H04L 63/0861* (2013.01); *G06F 21/316* (2013.01); *G06F 21/32* (2013.01);
(Continued)

(58) Field of Classification Search
CPC ... H04L 63/0861; G06F 21/316; G06F 21/32; G10L 15/26; G10L 17/14; G10L 17/26
See application file for complete search history.

(56) References Cited

U.S. PATENT DOCUMENTS 10,163,105 B1 * 12/2018 Ziraknejad ......... G06Q 20/3274
10,715,528 B1 *  7/2020 Leblang ................. H04W 4/02
(Continued)

FOREIGN PATENT DOCUMENTS

WO    WO-2008047339 A2 *  4/2008 ............. G10L 17/06

OTHER PUBLICATIONS

International Search Report and Written Opinion of the International Searching Authority in corresponding International Application No. PCT/US20/50517, dated Dec. 10, 2020.

*Primary Examiner* — Richard A McCoy
(74) *Attorney, Agent, or Firm* — Greenblum & Bernstein, P.L.C.

(57) ABSTRACT

Systems and methods for determining whether a voice biometrics credential provides a reliable mechanism for authenticating a user are provided. The method includes receiving at least one set of voice data from the user; determining, based on the received at least one set of voice data, a value of at least one parameter that corresponds to a user-specific voice biometrics credential; obtaining at least one user-specific item of information; accessing at least one business rule that relates to the user; and determining, based on the at least one set of voice data, the at least one user-specific item of information, and the at least one business rule, whether the user-specific voice biometrics credential is usable for authenticating the user.

18 Claims, 5 Drawing Sheets

(51) Int. Cl.
  *G10L 17/26* (2013.01)
  *G06F 21/31* (2013.01)
  *G10L 17/14* (2013.01)
  *G06F 21/32* (2013.01)
  *G10L 15/26* (2006.01)
(52) U.S. Cl.
  CPC .............. *G10L 15/26* (2013.01); *G10L 17/14* (2013.01); *G10L 17/26* (2013.01)

(56) References Cited

U.S. PATENT DOCUMENTS

| | | | |
|---|---|---|---|
| 2015/0089585 A1* | 3/2015 | Novack | H04L 63/08 |
| | | | 726/3 |
| 2015/0143494 A1* | 5/2015 | Lee | G06F 21/316 |
| | | | 726/7 |
| 2015/0324430 A1 | 11/2015 | Koran et al. | |
| 2016/0112569 A1 | 4/2016 | Timem et al. | |
| 2016/0292408 A1 | 10/2016 | Zhang et al. | |
| 2019/0080072 A1* | 3/2019 | Van Os | G06F 3/016 |
| 2019/0163891 A1 | 5/2019 | Kursun et al. | |
| 2019/0268329 A1* | 8/2019 | Toth | G06F 21/6209 |
| 2021/0014266 A1* | 1/2021 | Keret | H04L 63/0861 |
| 2021/0043189 A1* | 2/2021 | Pyun | G06F 21/32 |

* cited by examiner

METHOD AND SYSTEM FOR INTEGRATING VOICE BIOMETRICS

BACKGROUND

1. Field of the Disclosure

This technology generally relates to methods and systems for authenticating a user, and more particularly, to methods and systems for determining whether a voice biometrics credential provides a reliable mechanism for authenticating a user.

2. Background Information

Many online systems and applications require user authentication for security purposes, such as protecting user data and privacy. Conventional systems use various authentication techniques, such as passwords, security questions, and biometric techniques, such as fingerprint entry.

An effective authentication technique must be relatively quick and easy to use, while also maintaining a very high level of accuracy, in order to ensure user safety and security without wasting a user's time. In this regard, one possible mechanism for performing user authentication is a voice biometrics credential, which may be usable if the authentication system is able to accurately determine whether the voice biometric data corresponds to a particular user.

Accordingly, there is a need for a method for determining whether a voice biometrics credential is usable for performing user authentication in an efficient, accurate, and secure manner.

SUMMARY

The present disclosure, through one or more of its various aspects, embodiments, and/or specific features or sub-components, provides, inter alia, various systems, servers, devices, methods, media, programs, and platforms for determining whether a voice biometrics credential provides a reliable mechanism for authenticating a user.

According to an aspect of the present disclosure, a method for determining whether a voice biometrics credential provides a reliable mechanism for authenticating a user is provided. The method includes: receiving at least one set of voice data from the user; determining, based on the received at least one set of voice data, a value of at least one parameter that corresponds to a user-specific voice biometrics credential; obtaining at least one user-specific item of information; accessing at least one business rule that relates to the user; and determining, based on the at least one set of voice data, the at least one user-specific item of information, and the at least one business rule, whether the user-specific voice biometrics credential is usable for authenticating the user.

The at least one user-specific item of information may include at least one of an information item that relates to a user risk, an information item that relates to a user behavior, and an information item that relates to a user tenure.

The method may further include prompting the user to provide at least one additional item of information that is usable for authenticating the user, and receiving the at least one additional item of information. The determining whether the user-specific voice biometrics credential is usable for authenticating the user may include determining whether the user-specific voice biometrics credential is usable for authenticating the user based on the at least one set of voice data, the at least one user-specific item of information, the at least one business rule, and the at least one additional item of information.

The at least one additional item of information may include at least one of a username-password combination, an answer to a security question, a fingerprint, and a facial recognition input.

The at least one parameter that corresponds to a user-specific voice biometrics credential may include at least one of a parameter that relates to a length of the received at least one set of voice data, a parameter that relates to whether the received at least one set of voice data is passive voice data versus active voice data, and a parameter that relates to an audio wave pattern that corresponds to the received at least one set of voice data.

The method may further include waiting for a predetermined time interval after receiving a first one of the at least one set of voice data. The obtaining at least one user-specific item of information may include obtaining at least one information item that relates to a user behavior during the predetermined time interval.

The at least one information item that relates to a user behavior that is obtained during the predetermined time interval may include at least one of information that relates to a frequency of digital activity by the user during the predetermined time interval and information that indicates a difference with respect to user behavior that occurred prior to the receiving the first one of the at least one set of voice data.

The predetermined time interval may be at least one hour, at least two hours, at least 24 hours, at least two days, or at least 30 days.

The determining whether the user-specific voice biometrics credential is usable for authenticating the user may include using the at least one set of voice data, the at least one user-specific item of information, and the at least one business rule to calculate a risk level that relates to a probability that the voice biometrics credential accurately authenticates the user.

The receiving at least one set of voice data from the user may include receiving a first set of voice data from the user at a first time and receiving at least a second set of voice data from the user at a second time that is different from the first time.

According to another aspect of the present disclosure, a computing apparatus for determining whether a voice biometrics credential provides a reliable mechanism for authenticating a user is provided. The computing apparatus includes a processor, a memory, and a communication interface coupled to each of the processor and the memory. The processor is configured to: receive, via the communication interface, at least one set of voice data from the user; determine, based on the received at least one set of voice data, a value of at least one parameter that corresponds to a user-specific voice biometrics credential; obtain at least one user-specific item of information; access, from the memory, at least one business rule that relates to the user; and determine, based on the at least one set of voice data, the at least one user-specific item of information, and the at least one business rule, whether the user-specific voice biometrics credential is usable for authenticating the user.

The at least one user-specific item of information may include at least one of an information item that relates to a user risk, an information item that relates to a user behavior, and an information item that relates to a user tenure.

The processor may be further configured to: prompt the user to provide at least one additional item of information that is usable for authenticating the user; receive, via the communication interface, the at least one additional item of information; and determine whether the user-specific voice biometrics credential is usable for authenticating the user based on the at least one set of voice data, the at least one user-specific item of information, the at least one business rule, and the at least one additional item of information.

The at least one additional item of information may include at least one of a username-password combination, an answer to a security question, a fingerprint, and a facial recognition input.

The at least one parameter that corresponds to a user-specific voice biometrics credential may include at least one of a parameter that relates to a length of the received at least one set of voice data, a parameter that relates to whether the received at least one set of voice data is passive voice data versus active voice data, and a parameter that relates to an audio wave pattern that corresponds to the received at least one set of voice data.

The processor may be further configured to wait for a predetermined time interval after receiving a first one of the at least one set of voice data, and to obtain at least one information item that relates to a user behavior during the predetermined time interval.

The at least one information item that relates to a user behavior that is obtained during the predetermined time interval may include at least one of information that relates to a frequency of digital activity by the user during the predetermined time interval and information that indicates a difference with respect to user behavior that occurred prior to the reception of the first one of the at least one set of voice data.

The predetermined time interval may be at least one hour, at least two hours, at least 24 hours, at least two days, or at least 30 days.

The processor may be further configured to use the at least one set of voice data, the at least one user-specific item of information, and the at least one business rule to calculate a risk level that relates to a probability that the voice biometrics credential accurately authenticates the user.

The processor may be further configured to receive, via the communication interface, a first set of voice data from the user at a first time and at least a second set of voice data from the user at a second time that is different from the first time.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
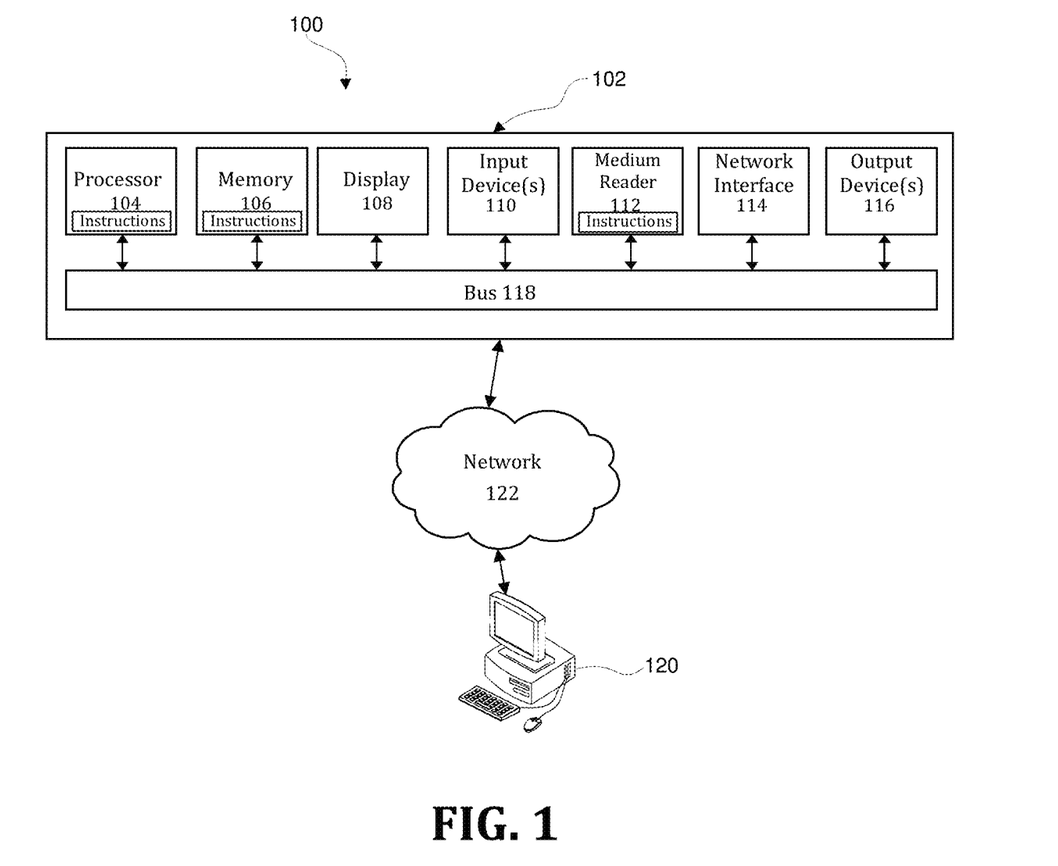
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for determining whether a voice biometrics credential provides a reliable mechanism for authenticating a user.

Figure 2:
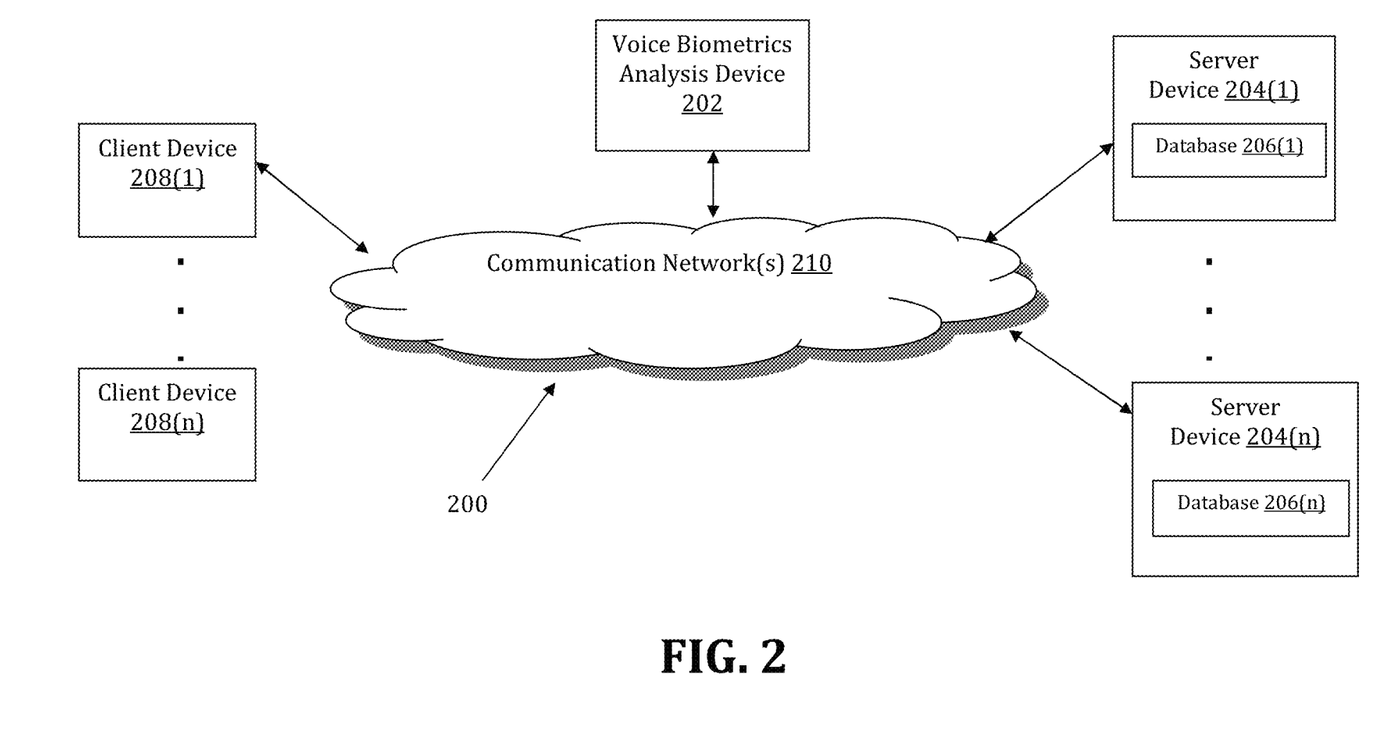
FIG. 2 illustrates an exemplary diagram of a network environment.

Referring to FIG. 2, a schematic of an exemplary network environment 200 for implementing a method for determining whether a voice biometrics credential provides a reliable mechanism for authenticating a user is illustrated. In an exemplary embodiment, the method is executable on any networked computer platform, such as, for example, a personal computer (PC).

The method for determining whether a voice biometrics credential provides a reliable mechanism for authenticating a user may be implemented by a Voice Biometrics Analysis (VBA) device 202. The VBA device 202 may be the same or similar to the computer system 102 as described with respect to FIG. 1. The VBA device 202 may store one or more applications that can include executable instructions that, when executed by the VBA device 202, cause the VBA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VBA device 202 itself, may be located in virtual server(s) running in a cloud-based computing environment rather than being tied to one or more specific physical network computing devices. Also, the application(s) may be running in one or more virtual machines (VMs) executing on the VBA device 202. Additionally, in one or more embodiments of this technology, virtual machine(s) running on the VBA device 202 may be managed or supervised by a hypervisor.

In the network environment 200 of FIG. 2, the VBA device 202 is coupled to a plurality of server devices 204(1)-204(n) that hosts a plurality of databases 206(1)-206(n), and also to a plurality of client devices 208(1)-208(n) via communication network(s) 210. A communication interface of the VBA device 202, such as the network interface 114 of the computer system 102 of FIG. 1, operatively couples and communicates between the VBA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VBA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and VBA devices that efficiently implement a method for determining whether a voice biometrics credential provides a reliable mechanism for authenticating a user.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VBA device 202 may be a standalone device or integrated with one or more other devices or apparatuses, such as one or more of the server devices 204(1)-204(n), for example. In one particular example, the VBA device 202 may include or be hosted by one of the server devices 204(1)-204(n), and other arrangements are also possible. Moreover, one or more of the devices of the VBA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(l)-204(n) may include, among other features, one or more processors, a memory, and a communication interface, which are coupled together by a bus or other communication link, although other numbers and/or types of network devices may be used. The server devices 204(1)-204(n) in this example may process requests received from the VBA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store user operation data, business rules, and any other data that is usable for determining whether a voice biometrics credential provides a reliable mechanism for authenticating a user.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the VBA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the VBA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the VBA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VBA device 202, the server devices 204(1)-204(n), or the client devices 208(1)-208(n), for example, may be configured to operate as virtual instances on the same physical machine. In other words, one or more of the VBA device 202, the server devices 204(1)-204(n), or the client devices 208(1)-208(n) may operate on the same physical device rather than as separate devices communicating through communication network(s) 210. Additionally, there may be more or fewer VBA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
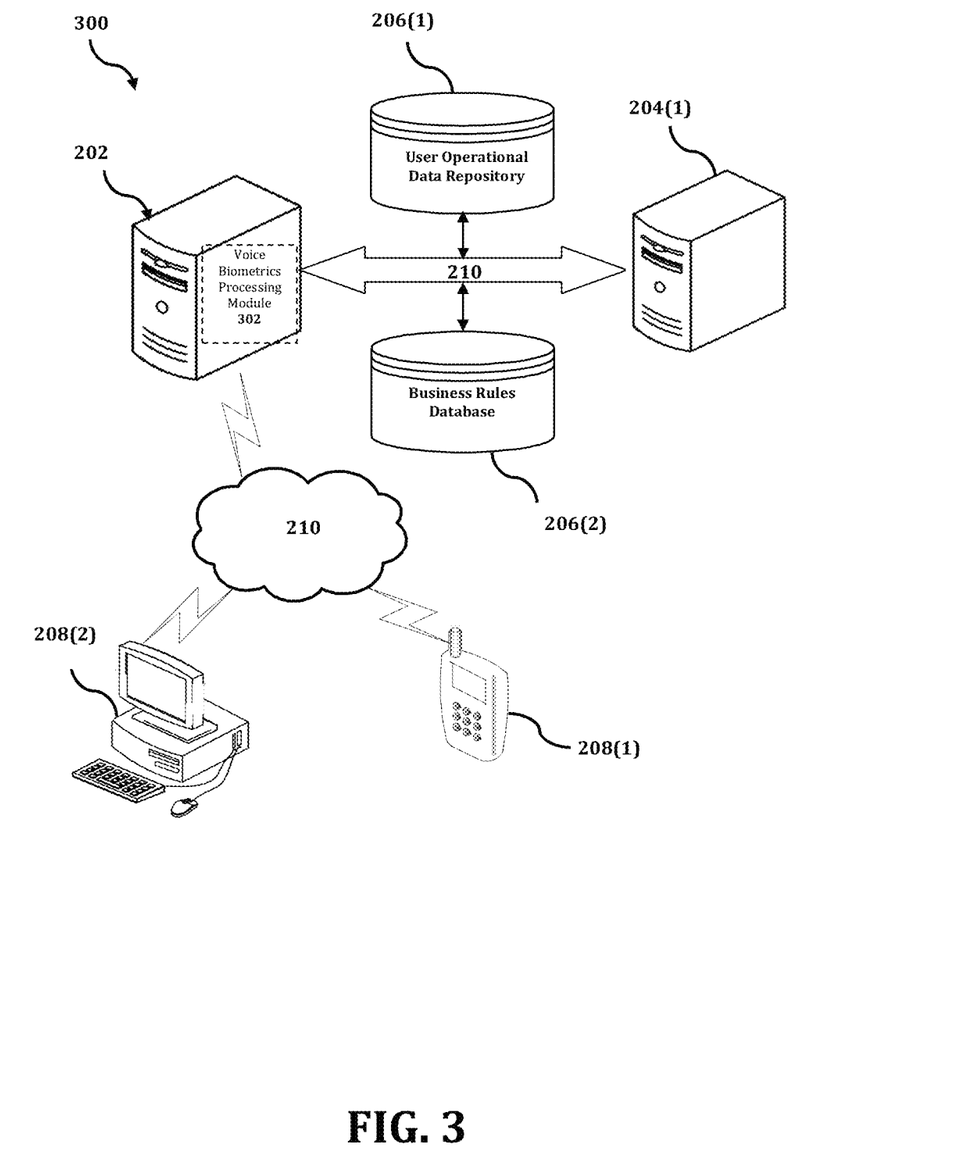
FIG. 3 shows an exemplary system for implementing a method for determining whether a voice biometrics credential provides a reliable mechanism for authenticating a user.

The VBA device 202 is described and shown in FIG. 3 as including a voice biometrics processing module 302, although it may include other rules, policies, modules, databases, or applications, for example. As will be described below, the voice biometrics processing module 302 is configured to implement a method for determining whether a voice biometrics credential provides a reliable mechanism for authenticating a user in an automated, efficient, scalable, and reliable manner.

An exemplary process 300 for implementing a determination as to whether a voice biometrics credential provides a reliable mechanism for authenticating a user by utilizing the network environment of FIG. 2 is shown as being executed in FIG. 3. Specifically, a first client device 208(1) and a second client device 208(2) are illustrated as being in communication with VBA device 202. In this regard, the first client device 208(1) and the second client device 208(2) may be "clients" of the VBA device 202 and are described herein as such. Nevertheless, it is to be known and understood that the first client device 208(1) and/or the second client device 208(2) need not necessarily be "clients" of the VBA device 202, or any entity described in association therewith herein. Any additional or alternative relationship may exist between either or both of the first client device 208(1) and the second client device 208(2) and the VBA device 202, or no relationship may exist.

Further, VBA device 202 is illustrated as being able to access a user operational data repository 206(1) and a business rules database 206(2). The voice biometrics processing module 302 may be configured to access these databases for implementing a method for determining whether a voice biometrics credential provides a reliable mechanism for authenticating a user.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the VBA device 202 via broadband or cellular communication. Of course, these embodiments are merely exemplary and are not limiting or exhaustive.

Upon being started, the voice biometrics processing module 302 executes a process for determining whether a voice biometrics credential provides a reliable mechanism for authenticating a user. An exemplary process for determining whether a voice biometrics credential provides a reliable mechanism for authenticating a user is generally indicated at flowchart 400 in FIG. 4.

Figure 4:
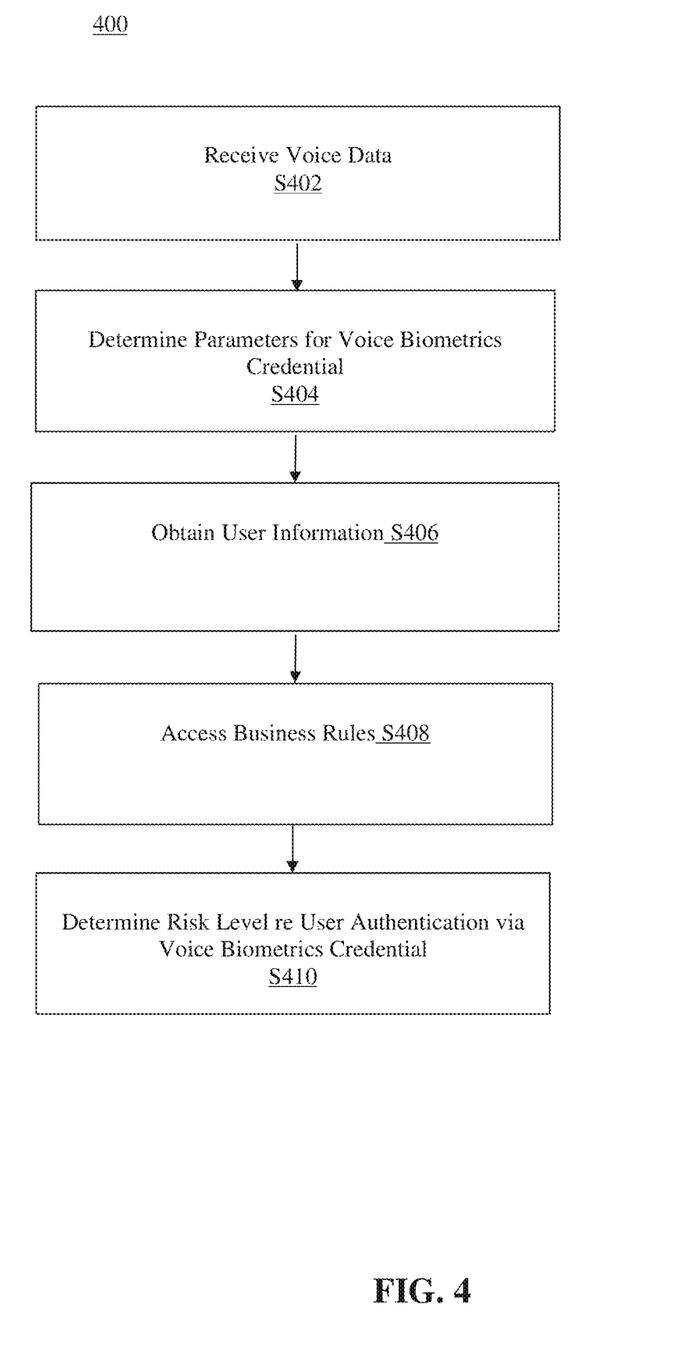
FIG. 4 is a flowchart of an exemplary process for implementing a method for determining whether a voice biometrics credential provides a reliable mechanism for authenticating a user.

In the process 400 of FIG. 4, at step S402, the voice biometrics processing module 302 receives voice data from a user. In an exemplary embodiment, the user may be a customer of a business entity that provides services, and when the user initiates a telephone call to the business entity, the user's voice may be received and recorded by the voice biometrics processing module 302. Alternatively, the user may log into a mobile application that offers an opportunity to enroll in a voice biometrics system, and the voice biometrics processing module 302 may then prompt the user to provide a voice data input.

At step S404, the voice biometrics processing module 302 determines values for a set of parameters that correspond to a user-specific voice biometrics credential. In an exemplary embodiment, the parameters may include any one or more of a parameter that relates to a length of the received voice data, a parameter that relates to whether the received voice data is passive voice data versus active voice data, and a parameter that relates to an audio wave pattern that corresponds to the received voice data.

At step S406, the voice biometrics processing module 302 obtains information that pertains to the user. In an exemplary embodiment, the user-specific information may include any one or more of information that relates to a user risk, information that relates to a user behavior, and information that relates to a user tenure. Further, the voice biometrics processing module may also prompt the user to provide at least one additional item of information that is usable for authenticating the user, such as any one or more of a username-password combination, an answer to a security question, a fingerprint, and a facial recognition input.

At step S408, the voice biometrics processing module 302 accesses business rules that may be relevant for determining whether a voice biometrics credential is usable for authenticating a user. In an exemplary embodiment, the business rules may include provisions that relate to an overall system risk with respect to a confidence level by which the voice biometrics credential accurately authenticates the user. In addition, the business rules database 206(2) may provide a mechanism by which additional rules for shutting down the use of the voice biometrics credential for user authentication may be introduced, if desired.

At step S410, the voice biometrics processing module 302 determines whether the user-specific voice biometrics credential is usable for authenticating the user based on the received voice data, the user-specific information, the business rules, and the additional items of information. In an exemplary embodiment, the voice biometrics processing module 302 may use the voice data, the user-specific information, the business rules, and the additional items of information to calculate a risk level that relates to a probability that the voice biometrics credential accurately authenticates the user.

In an exemplary embodiment, the determination of step S410 may be made after waiting for a predetermined time interval after receiving the voice data at step S402. Further, the user-specific information obtained in step S406 may include information that relates to a user behavior during the predetermined time interval, such as, for example, information that relates to a frequency of digital activity by the user during the predetermined time interval and information that indicates a difference with respect to user behavior that occurred prior to the reception of the voice data. In an exemplary embodiment, the predetermined time interval may be at least one hour, at least two hours, at least 24 hours, at least two days, or at least 30 days. In this regard, if a fraudulent user is attempting to be authenticated, then the frequency of digital activity or a difference in user behavior may effectively act as a flag to the fraudulent attempt.

In an exemplary embodiment, the voice biometrics processing module 302 may determine that additional voice data is required for making the determination at step S410 regarding whether the user-specific voice biometrics credential is usable for authenticating the user. In this case, the method 400 may return to step S402, and a second set of voice data may be received from the user at a time that is later than the time at which the first set of voice data was received.

Figure 5:
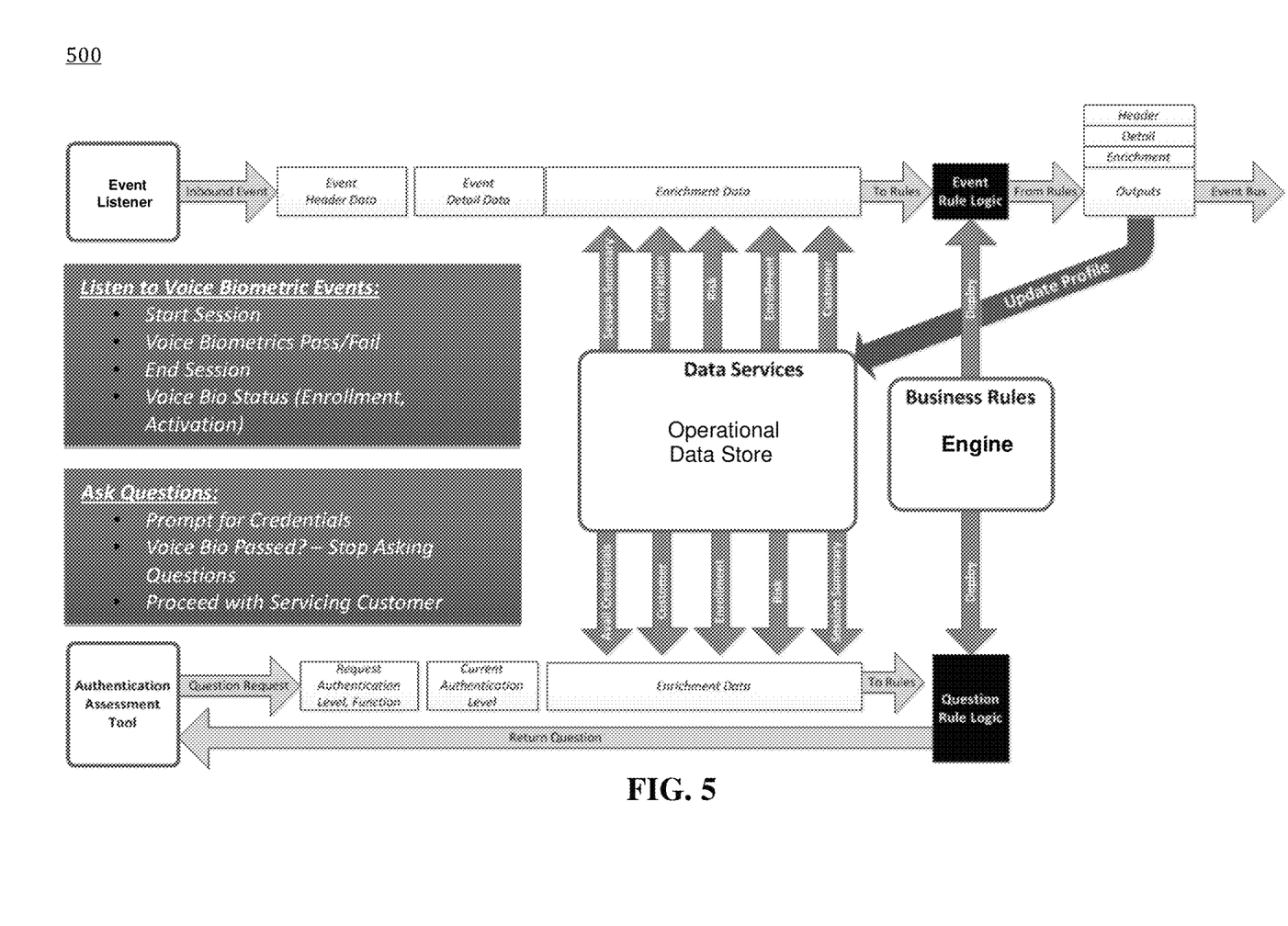
FIG. 5 is a data flow diagram that illustrates an implementation of a method for determining whether a voice biometrics credential provides a reliable mechanism for authenticating a user, according to an exemplary embodiment.

Referring to FIG. 5, a data flow diagram that illustrates an implementation of a method for determining whether a voice biometrics credential provides a reliable mechanism for authenticating a user is shown, according to an exemplary embodiment. As illustrated in FIG. 5, an event listener may act as an input port for customer behavior events, including voice data that is received in conjunction with an event, such as, for example, a received call from a user. When an event is initiated, the event listener receives the event and then extracts event header data and event detail data from the event. User data may then be obtained from an operational data store, such as, for example, user operational data repository 206(1), and the user data may be combined with the event header data and the event detail data to produce enrichment data, including customer behavior.

The enrichment data may then be forwarded to an event rule logic module and a question rule logic module, each of which may access one or more business rules from a business rules engine. The business rules engine is configured to make a determination regarding a risk level of the customer and the requested function. Then, the question rule logic module may evaluate the combined data to an authentication assessment tool to select the best credential for authenticating the user, with a preference for using a voice biometrics credential when risk, function and confidence levels allow. In an exemplary embodiment, the authentication assessment tool may make a pass/fail determination with respect to the voice biometrics credential, and if more data is needed for making the determination, the user may be prompted to provide additional credentials, such as a username/password combination or an answer to a security question. If the authentication assessment tool makes a determination that the voice biometrics credential is safe and reliable (i.e., a "pass" determination), then the customer servicing may proceed without further delay.

Accordingly, with this technology, an optimized process for determining whether a voice biometrics credential provides a reliable mechanism for authenticating a user is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for determining whether a voice biometrics credential provides a reliable mechanism for authenticating a user, the method comprising:
    detecting an event over a network that includes a requested function comprising a voice request from a user to perform the function;
    extracting event header data and event detail data;
    determining that the user must be authenticated before performing the requested function;
    determining a first authentication factor of a plurality possible authentication factors by selecting a default authentication factor from a selection of authentication factors comprising only a voice biometric authentication factor;
    in response to determining the first authentication factor, prompting the user to provide at least one set of voice data comprising a user-specific voice biometrics credential before determining whether additional authentication credentials from the plurality of possible authentication factors is required from the user;
    in response to the prompt, receiving spoken words from the user;
    determining, based only on the received spoken words, a value of at least one parameter including one or more audio characteristics that corresponds to the user-specific voice biometrics credential;
    determining a level of authentication of the user based on the determined value;
    obtaining at least one user-specific item of information;
    combining the user-specific item of information with the event header data and the event detail data for providing enrichment data;
    accessing at least one business rule that relates to the user and the requested function;
    determining a risk level of the requested function based on the at least one business rule;
    based on the determined risk level, evaluating a combination of the at least one set of voice data, the at least one user-specific item of information, and the at least one business rule for selecting a best credential for authenticating the user;

determining, based on the at least one set of voice data, the at least one user-specific item of information, and the at least one business rule, whether the user-specific voice biometrics credential is the best credential for authenticating the user;

determining whether the level of authentication is sufficient to authenticate the user for the requested function based on the determined risk level;

authenticating the user using the determined value without requesting additional information from the user when the level of authentication is determined to be sufficient for authentication for the determined risk level associated with the requested function, and based on the requested function, the at least one set of voice data, the at least one user-specific item of information, and the at least one business rule;

requesting, from the user, the additional authentication credentials when the level of authentication is determined to be insufficient for authentication for the determined risk level associated with the requested function;

authenticating the user using the additional authentication credentials instead of the determined value when the level of authentication is determined to be insufficient for authentication for the determined risk level associated with the requested function, and based on the requested function, the at least one set of voice data, the at least one user-specific item of information, and the at least one business rule and in response to authenticating the user using either the determined value or using the additional authentication credentials, performing the function.

2. The method of claim 1, wherein the at least one user-specific item of information includes at least one of an information item that relates to a user risk, an information item that relates to a user behavior, and an information item that relates to a user tenure.

3. The method of claim 1, wherein the additional authentication credentials include at least one of a username-password combination, an answer to a security question, a fingerprint, and a facial recognition input.

4. The method of claim 1, wherein the at least one parameter that corresponds to a user-specific voice biometrics credential includes at least one of a parameter that relates to a length of the received at least one set of voice data, a parameter that relates to whether the received at least one set of voice data is passive voice data versus active voice data, and a parameter that relates to an audio wave pattern that corresponds to the received at least one set of voice data.

5. The method of claim 1, further comprising waiting for a predetermined time interval after receiving a first one of the at least one set of voice data, and wherein the obtaining at least one user-specific item of information comprises obtaining at least one information item that relates to a user behavior during the predetermined time interval.

6. The method of claim 5, wherein the at least one information item that relates to a user behavior that is obtained during the predetermined time interval includes at least one of information that relates to a frequency of digital activity by the user during the predetermined time interval and information that indicates a difference with respect to user behavior that occurred prior to the receiving the first one of the at least one set of voice data.

7. The method of claim 1, wherein the method further comprises:
shutting down use of the user-specific voice biometrics credential for authenticating the user for the requested function based on the at least one business rule corresponding to the requested function.

8. The method of claim 1, wherein the determining whether the user-specific voice biometrics credential is the best credential for authenticating the user comprises using the at least one set of voice data, the at least one user-specific item of information, and the at least one business rule to calculate a risk level that relates to a probability that the voice biometrics credential accurately authenticates the user.

9. The method of claim 1, wherein the receiving at least one set of voice data from the user comprises receiving a first set of voice data from the user at a first time and receiving at least a second set of voice data from the user at a second time that is different from the first time.

10. A computing apparatus for determining whether a voice biometrics credential provides a reliable mechanism for authenticating a user, the computing apparatus comprising: a processor; a memory; and a communication interface coupled to each of the processor and the memory, wherein the processor is configured to:
detect an event over a network that includes a requested function comprising a voice request from a user to perform the function;
extract event header data and event detail data;
determine that the user must be authenticated before performing the requested function;
determine a first authentication factor of a plurality possible authentication factors by selecting a default authentication factor from a selection of authentication factors comprising only a voice biometric authentication factor;
in response to determining the first authentication factor, prompting the user to provide at least one set of voice data comprising a user-specific voice biometrics credential before determining whether additional authentication credentials from the plurality of possible authentication factors is required from the user;
in response to the prompt, receiving spoken words from the user;
determine, based only on the received spoken words, a value of at least one parameter including one or more audio characteristics that corresponds to the user-specific voice biometrics credential;
determining a level of authentication of the user based on the determined value;
obtain at least one user-specific item of information;
combine the user-specific item of information with the event header data and the event detail data for providing enrichment data;
access at least one business rule that relates to the user and the requested function;
determine a risk level of the requested function based on the at least one business rule;
based on the determined risk level, evaluating a combination of the at least one set of voice data, the at least one user-specific item of information, and the at least one business rule for selecting a best credential for authenticating the user;
determine, based on the at least one set of voice data, the at least one user-specific item of information, and the at least one business rule, whether the user-specific voice biometrics credential is the best credential for authenticating the user;

determine whether the level of authentication is sufficient to authenticate the user for the requested function based on the determined risk level;

authenticate the user using the determined value without requesting additional information from the user when the level of authentication is determined to be sufficient for authentication for the determined risk level associated with the requested function, and based on the requested function, the at least one set of voice data, the at leas tone user-specific item of information, and the at least one business rule;

request, from the user, the additional authentication credentials when the level of authentication is determined to be insufficient for authentication for the determined risk level associated with the requested function;

authenticate the user using the additional authentication credentials instead of the determined value when the level of authentication is determined to be insufficient for authentication for the determined risk level associated with the requested function, and based on the requested function, the at least one set of voice data, the at least one user-specific item of information, and the at least one business rule and in response to authenticating the user using either the determined value or using the additional authentication credentials, performing the function.

11. The computing apparatus of claim 10, wherein the at least one user-specific item of information includes at least one of an information item that relates to a user risk, an information item that relates to a user behavior, and an information item that relates to a user tenure.

12. The computing apparatus of claim 10, wherein the additional authentication credentials include at least one of a username-password combination, an answer to a security question, a fingerprint, and a facial recognition input.

13. The computing apparatus of claim 10, wherein the at least one parameter that corresponds to a user-specific voice biometrics credential includes at least one of a parameter that relates to a length of the received at least one set of voice data, a parameter that relates to whether the received at least one set of voice data is passive voice data versus active voice data, and a parameter that relates to an audio wave pattern that corresponds to the received at least one set of voice data.

14. The computing apparatus of claim 10, wherein the processor is further configured to wait for a predetermined time interval after receiving a first one of the at least one set of voice data, and to obtain at least one information item that relates to a user behavior during the predetermined time interval.

15. The computing apparatus of claim 14, wherein the at least one information item that relates to a user behavior that is obtained during the predetermined time interval includes at least one of information that relates to a frequency of digital activity by the user during the predetermined time interval and information that indicates a difference with respect to user behavior that occurred prior to the reception of the first one of the at least one set of voice data.

16. The computing apparatus of claim 10,
wherein the processor shuts down use of the user-specific voice biometrics credential for authenticating the user for the requested function based on the at least one business rule corresponding to the requested function.

17. The computing apparatus of claim 10, wherein the processor is further configured to use the at least one set of voice data, the at least one user-specific item of information, and the at least one business rule to calculate a risk level that relates to a probability that the voice biometrics credential accurately authenticates the user.

18. The computing apparatus of claim 10, wherein the processor is further configured to receive, via the communication interface, a first set of voice data from the user at a first time and at least a second set of voice data from the user at a second time that is different from the first time.

\* \* \* \* \*